June 28, 1960     I. S. PAYNE     2,942,705
VEHICLE BRAKING DEVICE
Filed Oct. 15, 1957
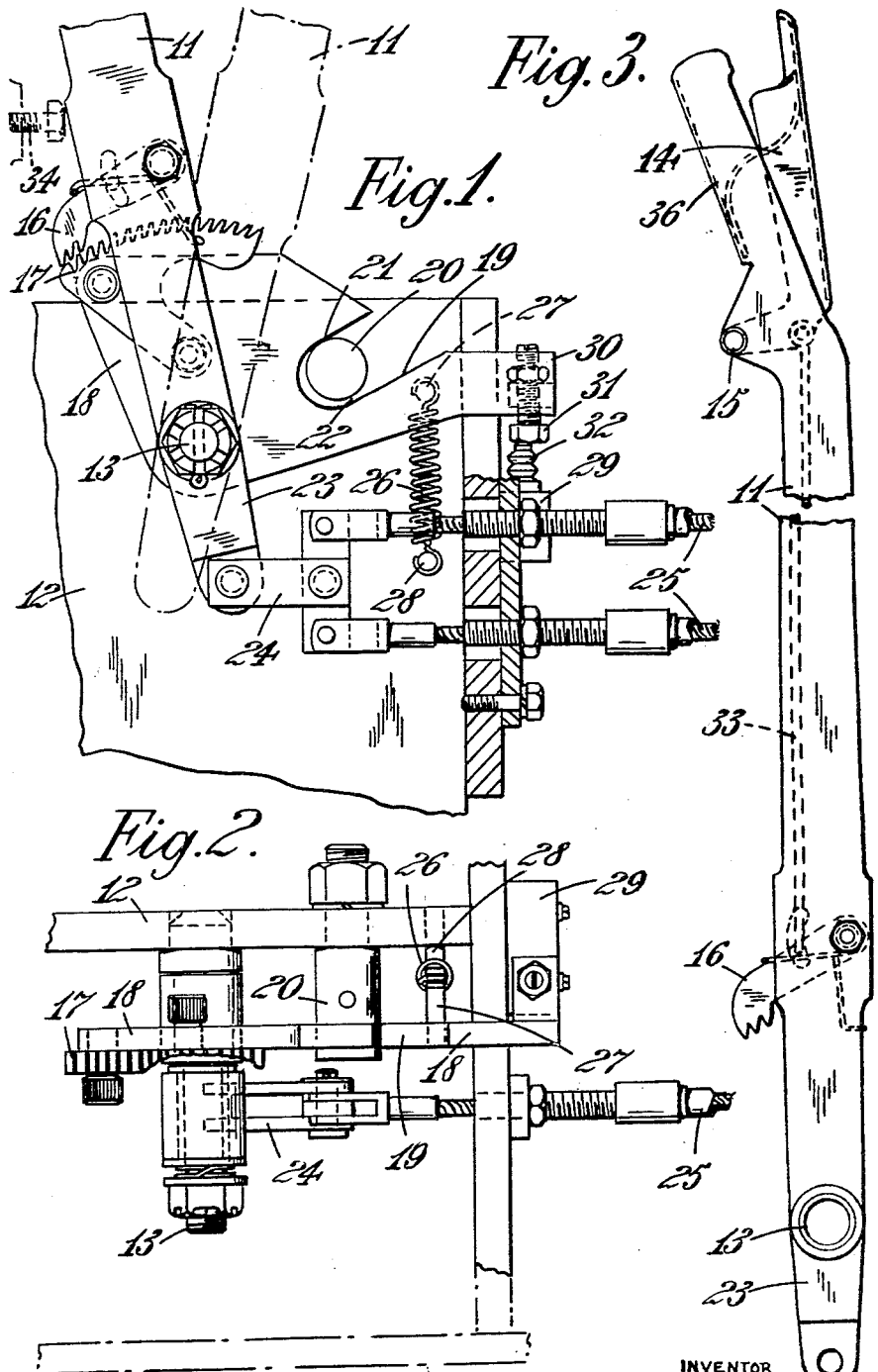
INVENTOR
IVAN S. PAYNE
By Martin Kirkpatrick
ATTORNEY United States Patent Office 2,942,705
Patented June 28, 1960

2,942,705

VEHICLE BRAKING DEVICE

Ivan Salisbury Payne, Basingstoke, England, assignor to Emmanuel Kaye and John Reginald Sharp, both of Basingstoke, England Filed Oct. 15, 1957, Ser. No. 690,383

Claims priority, application Great Britain Oct. 15, 1956

5 Claims. (Cl. 192—2)

In electrically propelled vehicles it is the normal practice to arrange the controls so that when the hand brake is applied, the current supply from the batteries is switched off, since this guards against the risk of the truck being driven away with the brakes applied. In some cases it is also necessary to prevent the driver leaving the vehicle with the current still passing through the control gear and discharging the batteries. However an interlock between the hand brake and the control circuit which necessitates the brake being completely "off" before the power is switched on, and vice versa, is not desirable owing to the possibility of a vehicle stopped on a gradient commencing to run away while the brake is being released and before the driver has power under the control of his operating pedal for starting the traction motor.

Also interlocking connections depending on the position of brake parts such as levers and cables transmitting the braking effort, are complicated by the requirements for periodic brake adjustment which may alter the setting of interlock switches. It is an object of the present invention to provide an arrangement which overcomes these difficulties.

According to the present invention, a brake for an electrically powered vehicle having a ratchet mechanism to hold the brake lever on and a ratchet release on the brake lever, is characterised in that the ratchet mechanism has a brake reaction transmitting element which is movable under the braking effort and co-operates with an interlock for interrupting the power circuit when the brake is "on," so that the power circuit is restored when the braking effort is relieved from the brake reaction transmitting element by the driver actuating the ratchet release.

In the preferred construction the brake comprises a lever pivoted on a ratchet carrier (which constitutes the brake reaction transmitting element), a toothed ratchet thereon, a pawl on the lever engageable with said ratchet, and the carrier is movably mounted on the vehicle frame for movement to operate an interlock switch when the brake is applied.

One form of a brake in accordance with the invention will now be described by way of example, reference being made to the accompanying drawings in which:

Figure 1 is a part vertical section and a part side elevation of the brake mechanism, Figure 2 is a plan view, the brake lever being assumed removed, Figure 3 is a side elevation of the brake lever.

The control comprises a hand lever 11 upstanding from the vehicle frame 12 and pivoted as at 13 at its lower end for movement to-and-fro, and a ratchet release member 14 (Figure 3) is pivoted as at 15 on the handle of the brake lever 11 whereby the truck driver can, on gripping the lever, at the same time release a pawl-and-ratchet mechanism 16, 17 at the foot of the lever for locking it in the "on" position. Normally the pawl-and-ratchet mechanism comprises a toothed segment fixed to the vehicle frame which is engaged by a pawl pivoted on the brake lever near its lower end, and the pawl can be released from engagement with the ratchet teeth of the segment by the release member at the upper end of the brake lever through the intermediary of a rod or cable connection running down the lever.

In the present arrangement, the ratchet toothed segment 17 is not fixed to the vehicle frame but is part of a carrier 18 pivoted at 13 to the frame 12 so as to be able to rock a limited amount to-and-fro in the same direction as the movement of the brake lever 11. The carrier member 18 constitutes a brake reaction transmitting element, and it is slotted as at 19 and in the slot so formed is located a fixed stop 20 secured to the vehicle framework 12. This stop is of suitable dimensions to allow the carrier member to rock to-and-fro a slight amount before contacting the stop at the points 21 and 22 indicated in Figure 1. The brake lever 11 has an extension 23 below the carrier to which is connected an operating rod 24 for bringing about the application of the brakes of the vehicle through brake cables 25. The arrangement is such that the brake lever 11 is pulled rearwards (to the chain line position of Figure 1) about its pivot 13 to apply the brakes and when so pulled rearwards is locked in position by engagement of the pawl-and-ratchet teeth until the pawl 16 is released by squeezing of the release member 14 at the upper end of the lever 11. A spring 26 is provided to pull the toothed carrier 18 over so that its edge 21 contacts the stop 20 for the purpose hereinafter described. The spring extends between two spring studs 27 and 28, the first secured to the carrier 18 and the second to the vehicle frame 12 (see Figure 2).

It will be seen that when the brake lever 11 is pulled rearward (i.e. to the right as seen in Figure 1) to the "on" position, the pawl 16 on the lever 11 travels freely over the ratchet teeth 17 on the rockable carrier 18 at the end of the lever, but when the vehicle driver lets go of the lever 11 in the "on" position, the pawl-and-ratchet teeth 16, 17 engage to prevent forward rocking of the lever 11 with respect to the carrier 18 and consequently at this moment the brake lever and carrier rock forwardly as one by a slight amount against the action of the carrier spring until the carrier surface 22 engages the stop. When the brake lever in the "on" position is gripped by the vehicle driver in readiness for releasing the brakes, and he moves the lever 11 just slightly further rearward in order to take up the pull on the brakes by his own effort prior to the ratchet release member 14 being squeezed to withdraw the pawl 16 from the ratchet teeth 17, the ratchet-toothed carrier rocks rearwardly as one with the lever. This forward and rearward rocking motion of the carrier 18 which occurs each time the brakes are applied and released, is employed to operate a switch 29 mounted on the frame just below the rearward extremity 30, this extremity having an adjustable contact 31 thereon to engage the contact 32 on the switch 29.

In operation the vehicle driver applies the brakes by pulling the lever 11 to the righthand side (chain line position as shown in Figure 1) and then letting go. The pawl-and-ratchet teeth engage and as before explained the carrier and lever then move over as one slightly to the lefthand side against the action of spring 26 until the edge 22 of the carrier 18 engages the stop 20. As also before mentioned the stop 20 is carefully dimensioned so that on engagement being made the extremity 30 of the carrier 18 has raised contact 31 and opened the electrical control circuit thus cutting off power to the vehicle motor.

Now when the release member 14 is squeezed prior to taking off the brake the pawl 16 is released by rod 33 (Figure 3) from the ratchet teeth 17 and the carrier 18 swings over under the action of spring 26 until its edge 21 contacts the stop 20. At the same time contact 31 reengages the switch 29 and re-establishes the control circuit to permit power to flow to the motor.

Thus although the power is always automatically switched off when the vehicle brakes are applied so that there is no wastage of current when the vehicle is standing and the vehicle motor cannot be made to pull if the brakes are left applied, nevertheless there is always power available at the time the brakes are under the manual control of the driver ready to be released. Since switching on of the power takes place before the brake lever is actually moved to the "off" position, the driver has power to enable him to start the motor with his control pedal as he simultaneously releases the hand brake, so that he can achieve a smooth start of the vehicle on a gradient without running back.

An adjustable stop screw 34 (shown in chain line in Figure 1) may be provided on a suitable part of the vehicle framework to limit the forward movement of the brake lever 11 when releasing the braking effort. The screw stop is located so that the pawl 16 does not overrun the end of the ratchet teeth 17.

I claim:

1. Brake applying means for interrupting the power supply of an electric vehicle comprising in combination a brake-operating lever pivotally mounted on the vehicle framework, a carrier pivotally mounted on the frame of the vehicle, stop means on the vehicle framework to limit pivotal movement of the carrier, a ratchet toothed segment on said carrier, a pawl on said brake lever to engage the ratchet, a pawl operating member pivotally mounted on the upper end of said lever, the pawl and ratchet providing means for locking the brake in the "on" position, a spring biasing the carrier against movement under the general braking reaction and switch means operable by said pivoted carrier for interrupting the power supply when the brake is "on," the power supply being restored by the spring when the ratchet is released.

2. Brake applying means according to claim 1 wherein the stop means is constituted by a peg on the vehicle framework and the carrier comprises a slot to receive said peg with slight lost motion.

3. Brake applying means for an electrically powered vehicle comprising a brake lever movable on a pivot on the vehicle frame, a brake reaction transmitting carrier, said carrier being mounted on said pivot, stop means on said vehicle frame to limit the pivotal movement of said carrier, a toothed ratchet on said carrier, a pawl on said lever engageable with said ratchet, switch means for interrupting the vehicle's power supply, said switch means being operated by the pivotally mounted carrier when the reaction force of the braking effort of the brake is transmitted to the ratchet on applying the brake.

4. A brake according to claim 3 wherein the stop is constituted by a peg on the vehicle framework and the carrier comprises a slot to receive the peg with slight lost motion.

5. Brake applying means for an electrically powered vehicle comprising switch means mounted on the vehicle frame for interrupting the vehicle's electrical power circuit, a brake operating lever including a pawl, a brake operating lever securing element pivotally mounted on said vehicle frame, said securing element including a ratchet adapted to cooperate with said pawl for securing said lever in a braking position, means for limiting the pivotal movement of said securing element, means associated with said securing element for operating said switch upon pivotal movement of said element, and resilient biasing means arranged normally to maintain said switch in closed position, the combination being arranged so that said member is pivoted to operate said switch and interrupt said circuit as a result of brake reaction force when said lever is in a braking position and said pawl and ratchet are engaged to secure said lever in said braking position, and said switch is adapted to be closed under the influence of said biasing means upon disengagement of said pawl from said ratchet without movement of said braking lever.

References Cited in the file of this patent

UNITED STATES PATENTS

| | | |
|---|---|---|
| 738,100 | Cuntz | Sept. 1, 1903 |
| 738,167 | Day | Sept. 8, 1903 |
| 1,069,165 | Nix | Aug. 5, 1913 |
| 1,859,328 | Cobb | May 24, 1932 |
| 2,281,467 | Thorp | Apr. 28, 1942 |